(12) United States Patent
Ryu et al.

(10) Patent No.: US 10,803,735 B2
(45) Date of Patent: *Oct. 13, 2020

(54) AGENT APPARATUS, ELECTRICAL APPARATUS, AND METHOD OF CONTROLLING AGENT APPARATUS

(71) Applicant: SAMSUNG ELECTRONICS CO., LTD., Suwon-si, Gyeonggi-do (KR)

(72) Inventors: Young Jun Ryu, Suwon-si (KR); Yong Hoon Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,282

(22) Filed: Jan. 24, 2019

(65) Prior Publication Data

US 2019/0156660 A1 May 23, 2019

Related U.S. Application Data

(63) Continuation of application No. 15/183,038, filed on Jun. 15, 2016, now Pat. No. 10,204,510, which is a
(Continued)

(30) Foreign Application Priority Data

Oct. 31, 2012 (KR) .......................... 10-2012-0121762

(51) Int. Cl.
*G08C 17/02* (2006.01)
*H04N 5/44* (2011.01)
(Continued)

(52) U.S. Cl.
CPC .......... *G08C 17/02* (2013.01); *H04L 12/2814* (2013.01); *H04N 5/4403* (2013.01);
(Continued)

(58) Field of Classification Search
CPC .......................... G08C 17/02; G08C 2201/33; G08C 2201/40; G08C 2201/41; G08C 2201/92;
(Continued)

(56) References Cited

U.S. PATENT DOCUMENTS 4,808,992 A 2/1989 Beyers, Jr.
6,182,094 B1 1/2001 Humpleman
(Continued)

FOREIGN PATENT DOCUMENTS

| CN | 1206479 A | 1/1999 |
|----|-----------|--------|
| CN | 1392705 A | 1/2003 |

(Continued)

OTHER PUBLICATIONS

European Search Report dated Nov. 6, 2014 issued in corresponding European Patent Application 13190420.3.
(Continued)

*Primary Examiner* — Adnan Aziz
(74) *Attorney, Agent, or Firm* — Staas & Halsey LLP

(57) ABSTRACT

A display apparatus including a display which displays content, a communicator configured to communicate with a remote controller and an external device, and a controller. The controller being configured to, upon receiving a control command from the external device, control operation of the display apparatus based on the received control command, control the received control command to be transmitted to the remote controller, and control the communicator to transmit the received control command to the external device through the remote controller.

18 Claims, 12 Drawing Sheets

Related U.S. Application Data continuation of application No. 14/065,983, filed on Oct. 29, 2013, now Pat. No. 9,390,618.

(51) Int. Cl.
| | | |
|---|---|---|
| *H04N 21/41* | (2011.01) | |
| *H04N 21/45* | (2011.01) | |
| *H04N 21/422* | (2011.01) | |
| *H04N 21/4415* | (2011.01) | |
| *H04L 12/28* | (2006.01) | |

(52) U.S. Cl.
CPC ... *H04N 21/4131* (2013.01); *H04N 21/42204* (2013.01); *H04N 21/42225* (2013.01); *H04N 21/4415* (2013.01); *H04N 21/4532* (2013.01); *G08C 2201/33* (2013.01); *G08C 2201/40* (2013.01); *G08C 2201/41* (2013.01); *G08C 2201/92* (2013.01); *H04L 2012/2841* (2013.01); *H04L 2012/2849* (2013.01); *H04N 2005/4432* (2013.01); *H04N 2005/4444* (2013.01)

(58) Field of Classification Search
CPC .......... H04N 21/4415; H04N 21/4532; H04N 21/42225; H04N 21/42204; H04N 21/4131; H04N 5/4403; H04N 2005/4444; H04N 2005/4432; H04L 12/2814; H04L 2012/2841; H04L 2012/2849

See application file for complete search history.

(56) References Cited

U.S. PATENT DOCUMENTS

| | | | |
|---|---|---|---|
| 6,239,718 | B1 | 5/2001 | Hoyt |
| 6,690,392 | B1 | 2/2004 | Wugoski |
| 6,792,323 | B2 | 9/2004 | Krzyzanowski |
| 7,005,979 | B2 | 2/2006 | Haughawout et al. |
| 7,224,323 | B2 | 5/2007 | Uchida |
| 7,379,778 | B2 | 5/2008 | Hayes |
| 7,626,641 | B1 | 12/2009 | Beals |
| 7,716,637 | B2 | 5/2010 | Getsch et al. |
| 8,098,337 | B2 | 1/2012 | Martch |
| 8,145,803 | B2 | 3/2012 | Hwang et al. |
| 8,797,151 | B2 | 8/2014 | Ohashi |
| 8,922,334 | B2 | 12/2014 | Hale et al. |
| 2002/0194596 | A1 | 12/2002 | Srivastava |
| 2003/0046698 | A1* | 3/2003 | Kamen .............. H04N 5/44543 725/53 |
| 2004/0207535 | A1* | 10/2004 | Stevenson .......... H04B 10/1143 340/4.31 |
| 2005/0097618 | A1 | 5/2005 | Arling |
| 2005/0110652 | A1 | 5/2005 | Becker et al. |
| 2005/0231414 | A1 | 10/2005 | Chu |
| 2006/0187079 | A1 | 8/2006 | Stevenson et al. |
| 2007/0052547 | A1* | 3/2007 | Haughawout ........ H04N 5/4403 340/4.31 |
| 2007/0099694 | A1 | 5/2007 | McCarthy |
| 2007/0101381 | A1 | 5/2007 | Furlong |
| 2008/0170164 | A1 | 7/2008 | Park |
| 2008/0228289 | A1 | 9/2008 | Hwang et al. |
| 2008/0294986 | A1 | 11/2008 | Seo |
| 2009/0066837 | A1 | 3/2009 | Choi |
| 2009/0239587 | A1 | 9/2009 | Negron |
| 2010/0107105 | A1* | 4/2010 | Kubo .................. G06F 3/0238 715/773 |
| 2010/0156694 | A1 | 6/2010 | Rye et al. |
| 2010/0238062 | A1 | 9/2010 | Sunaga |
| 2010/0302461 | A1 | 12/2010 | Lim |
| 2010/0315563 | A1 | 12/2010 | Park |
| 2011/0050387 | A1 | 3/2011 | Kim |
| 2011/0084867 | A1 | 4/2011 | Friedlander |
| 2011/0085083 | A1 | 4/2011 | Friedlander |
| 2011/0113441 | A1 | 5/2011 | Jeong et al. |
| 2011/0161528 | A1 | 6/2011 | Ohashi |
| 2011/0273625 | A1 | 11/2011 | McMahon |
| 2011/0287757 | A1* | 11/2011 | Nykoluk ................ G08C 17/02 455/419 |
| 2011/0314386 | A1 | 12/2011 | Jeong |
| 2012/0007763 | A1 | 1/2012 | Hale et al. |
| 2012/0319942 | A1 | 12/2012 | Kim |
| 2013/0010209 | A1* | 1/2013 | Takiguchi ............ H04N 21/475 348/739 |
| 2013/0067236 | A1 | 3/2013 | Mountain |

FOREIGN PATENT DOCUMENTS

| | | | |
|---|---|---|---|
| CN | 1578245 | A | 2/2005 |
| CN | 101729084 | | 6/2010 |
| EP | 1 727 107 | A2 | 11/2006 |
| EP | 1 727 107 | B1 | 7/2008 |
| EP | 2 339 558 | A2 | 6/2011 |
| EP | 2555512 | | 2/2013 |
| JP | 2000-287388 | | 10/2000 |
| JP | 2006-211541 | | 8/2006 |
| JP | 2006211541 | A * | 8/2006 |
| JP | 2010-109446 | | 5/2010 |
| KR | 10-2012-099857 | A | 9/2012 |
| WO | 2011/118838 | | 9/2011 |
| WO | WO 2012/036475 | | 3/2012 |

OTHER PUBLICATIONS

International Search Report dated Feb. 19, 2014 in corresponding International Patent Application PCT/KR2013/009705.
European Office Action dated Aug. 23, 2016 in corresponding European Patent Application No. 13 190 420.3.
Chinese Office Action dated Aug. 30, 2017 in corresponding Chinese Patent Application No. 201310532924.1.
European Summons to attend Oral Proceedings dated Aug. 16, 2017 in corresponding European Patent Application No. 13190420.3.
European Communication under Rule 71(3) EPC dated Feb. 6, 2018 in European Patent Application No. 13190420.3.
European Communication under Rule 124(4) EPC dated Feb. 5, 2018 in European Patent Application No. 13190420.3.
Japanese Office Action dated Dec. 18, 2017 in Japanese Patent Application No. 2013-226745.
Korean Office Action dated Apr. 27, 2018 in Korean Patent Application No. 10-2012-0121762.
Japanese Office Action dated Apr. 2, 2018 in Japanese Patent Application No. 2013-226745.
Chinese Office Action dated Apr. 23, 2018 in Chinese Patent Application No. 201310532924.1.
Chinese Office Action dated Nov. 13, 2018 in corresponding Chinese Patent Application No. 201310532924.1.
European Office Action dated Sep. 24, 2018 in corresponding European Patent Application No. 18180227.3-1209.
U.S. Notice of Allowance dated Jan. 2, 2109 in U.S. Appl. No. 15/183,038.
U.S. Notice of Allowance dated Oct. 24, 2018 in U.S. Appl. No. 15/183,038.
U.S. Notice of Allowance dated Sep. 27, 2018 in U.S. Appl. No. 15/183,038.
U.S. Office Action dated Jun. 14, 2018 in U.S. Appl. No. 15/183,038.
U.S. Office Action dated Nov. 3, 2017 in U.S. Appl. No. 15/183,038.
U.S. Office Action dated Jul. 12, 2017 in U.S. Appl. No. 15/183,038.
U.S. Office Action dated Dec. 30, 2016 in U.S. Appl. No. 15/183,038.
Notice of Allowance dated Mar. 14, 2016 in U.S. Appl. No. 14/065,983.
Office Action dated Dec. 17, 2015 in U.S. Appl. No. 14/065,983.
Office Action dated Jun. 4, 2015 in U.S. Appl. No. 14/065,983.
U.S. Appl. No. 15/183,038, filed Jun. 15, 2016, Young Jun Ryu, et al., Samsung Electronics Co., Ltd.
U.S. Appl. No. 14/065,983 (now U.S. Pat. No. 9,390,618), filed Oct. 29, 2013, Young Jun Ryu, et al., Samsung Electronics Co., Ltd.
Chinese Office Action dated Jul. 25, 2019, in Chinese Patent Application No. 201310532924.1.

(56) References Cited

OTHER PUBLICATIONS

European Office Action dated Sep. 27, 2019 in European Patent Application No. 18180227.3.
Chinese Office Action dated Apr. 8, 2019 in Chinese Patent Application No. 201310532924.1.
Japanese Office Action dated Jun. 3, 2019 in Japanese Patent Application No. 2013-226745.

* cited by examiner

AGENT APPARATUS, ELECTRICAL APPARATUS, AND METHOD OF CONTROLLING AGENT APPARATUS

CROSS-REFERENCE TO RELATED APPLICATIONS

This application is a continuation application of U.S. patent application Ser. No. 15/183,038 filed on Jun. 15, 2016, which is a continuation application of U.S. patent application Ser. No. 14/065,983 filed on Oct. 29, 2013, now U.S. Pat. No. 9,390,618 issued Jul. 12, 2016, which claims the priority benefit of Korean Patent Application No. 10-2012-0121762, filed on Oct. 31, 2012 in the Korean Intellectual Property Office, the disclosure of which is incorporated herein by reference.

BACKGROUND

1. Field

The following description relates to an agent apparatus to remotely control a plurality of electrical apparatuses in an integrated manner to improve user convenience, an electrical apparatus that communicates with the agent apparatus, and a method of controlling the agent apparatus.

2. Description of the Related Art

Home network technology enables an operation of electrical apparatuses at home in any time or place. According to home network technologies, operations of electrical apparatuses may be automated inside or outside the home.

A home network provides a more convenient for a user to connect a plurality of electrical apparatuses through a network and needs to sequentially issue operation commands via a key pad or a remote controller in order to perform various functions of a variety of electrical apparatuses. In this case, the user needs to be fully aware of complex manipulation of the remote controller.

For example, an audio visual (AV) system in a home includes remote controllers equal in number to the number of devices included in the AV system. That is, when the AV system includes six devices including a television (TV), a set top box (STB), a home theater, a digital versatile disc (DVD) player, a video device, and an audio device, the AV system includes six remote controllers for control of the devices.

During use of the AV system, when a user wants to see a DVD while watching TV, the user needs to reset the TV and DVD using respective remote controllers thereof.

For example, the user needs to turn on the DVD player, to switch from an external input of the TV that the user watches to 1, to switch a digital connection standard terminal (Sony-Philips Digital Interface Format: hereafter, referred to as SPDIF) to an input 1, and then, to operate the DVD player.

Thus, when a user operates a plurality of devices, although a use sequence of a variety of devices using a remote controller is preset, whenever the user wants to change operations of devices, the user needs to reset operations of the plurality of devices using a plurality of remote controllers.

Accordingly, a universal remote controller to control a plurality of electrical apparatuses in an integrated manner has been developed, and an agent apparatus for smooth communication between a remote controller and an electrical apparatus without regard to a communication distance, obstacle, and/or etc. has been developed. That is, the agent apparatus performs a function of relaying a control signal of a remote controller to an electrical apparatus.

For example, a universal remote controller for control of an AV system includes four mode selection buttons for selection of a TV, an STB, a DVD player, and a home theater, and includes a plurality of buttons for manipulation of the respective devices.

In this case, it is possible that at least one device positioned in a place where smooth communication is not achieved with a remote controller, among the TV, the STB, the DVD player, and the home theater relays the control signal of the universal remote controller through an agent apparatus.

When a user wants to see a DVD using a universal remote controller, the user pushes a TV mode selection button of the universal remote controller, switches from an external input of the TV to 1, pushes a DVD player mode selection button of the universal remote controller, pushes a power button the DVD player, and then, pushes a play button of the DVD player. Then, the user pushes a home theater mode selection button and switches from an SPDIF input of the home theater to 1.

In this case, respective control signals of the TV, the DVD player, and the home theater are transmitted directly to the TV, the DVD player, and the home theater, or transmitted through an agent apparatus.

Thus, the user needs to perform a process of selecting a device and manipulating the selected device a plurality of number of times, and thus, it takes a long time to perform the complex setting process.

In addition, the user needs to look for and push a specific button of the universal remote controller to select a device and to perform a specific function of the device selected by pushing the specific button, and thus, users who are not familiar with operating devices have difficulty in using the devices.

SUMMARY

Therefore, it is an aspect of the present disclosure to provide an agent apparatus and a method of controlling the same, to collect, store, and learn user information to identify a user and operation control information to operate at least one electrical apparatus, to generate and output a macro list for each respective user according to a learned result, and to transmit a control signal to at least one electrical apparatus.

It is another aspect of the present disclosure to provide an agent apparatus and a method of controlling the same, to collect, store, and learn environment information and to generate a macro list for each respective user according to a learned result.

It is a further aspect of the present disclosure to provide an electrical apparatus that operates based on a control signal transmitted from an agent apparatus and outputs a macro list transmitted from the agent apparatus.

Additional aspects of the disclosure will be set forth in part in the description which follows and, in part, will be apparent from the description, or may be learned by practice of the disclosure.

In accordance with one aspect of the present disclosure, an agent apparatus to relay operation control information between at least one remote controller and at least one electrical apparatus includes a communication unit to receive operation control information of the at least one electrical apparatus, transmitted from the at least one remote controller and to transmit the operation control information to the at least one electrical apparatus, a controller to learn the received operation control information of the at least one electrical apparatus to generate a macro and to control output of the generated macro, and a storage unit to store the operation control information of the at least one electrical apparatus and the generated macro.

In accordance with another aspect of the present disclosure, an agent apparatus includes an input unit to receive operation control information of at least one electrical apparatus and an output command of a macro list from a user, a controller to learn the operation control information of the at least one electrical apparatus to generate a macro, and to control output of a macro list including the generated macro when an output command of the macro list is input to the controller, a storage unit to store the input operation control information and the macro list, and a communication unit to transmit an operation control signal to the at least one electrical apparatus.

In accordance with another aspect of the present disclosure, an electrical apparatus operating based on operation control information transmitted from an agent apparatus includes a communication unit to receive operation control information transmitted from the agent apparatus and a macro list, a controller to control an operation of a load when information transmitted from the agent apparatus is operation control information, and to control display of a macro list when the information transmitted from the agent apparatus is the macro list, and a display unit to display the macro list.

In accordance with a further aspect of the present disclosure, a method of controlling an agent apparatus includes collecting operation control information of at least one electrical apparatus, storing the operation control information of the at least one electrical apparatus, transmitting the operation control information to the at least one electrical apparatus, learning the operation control information of the at least one electrical apparatus to generate a macro, adding the generated macro to a macro list and storing the macro list, and outputting the stored macro list.

According to an aspect of the present disclosure, an agent apparatus may learn functions of a plurality of electrical apparatuses that are frequently used by a user and provide the functions to the user such that the user may easily operate the plurality of electrical apparatuses, thereby improving user convenience.

The agent apparatus may write a macro based on user information and environment information, thereby reducing time and effort required to write a macro.

In addition, the agent apparatus may write a macro based on operation control information of a plurality of electrical apparatuses, input directly by a user, and thus, provide a macro desired by the user to the user.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Reference will now be made in detail to embodiments of the present disclosure, examples of which are illustrated in the accompanying drawings.

Figure 1:
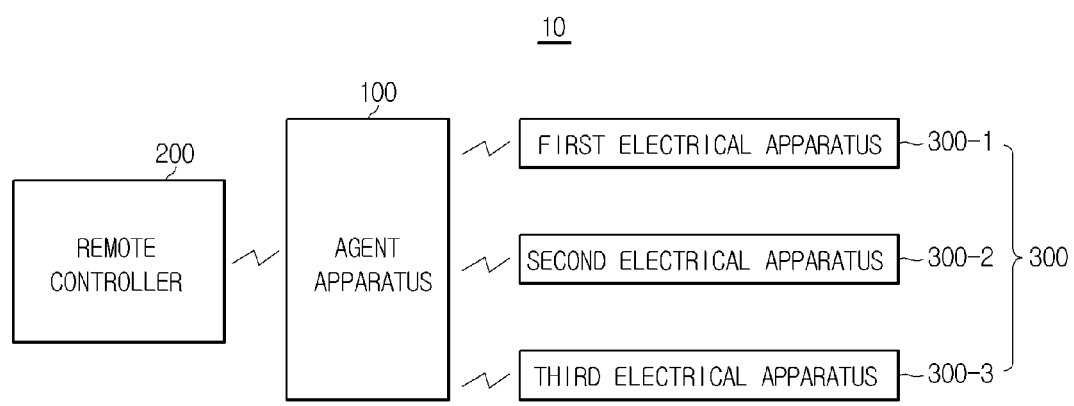
FIG. 1 is a diagram of a structure of an agent system including an agent apparatus according to an embodiment of the present disclosure.

FIG. 1 is a diagram of a structure of an agent system including an agent apparatus 100 according to an embodiment of the present disclosure. The agent system will be described with reference to FIGS. 2 to 5.

An agent system 10 may include the agent apparatus 100, a remote controller 200, and a plurality of electrical apparatuses 300. For example, the plurality of electrical apparatuses 300 may include a first electrical apparatus 300-1, a second electrical apparatus 300-2, and a third electrical apparatus 300-3.

The agent apparatus 100 relays information between the remote controller 200 and the plurality of electrical apparatuses 300-1, 300-2, and 300-3. The agent apparatus 100 receives operation control information, of at least one electrical apparatus 300, transmitted from the remote controller 200, and transmits the received operation control information of at least one electrical apparatus 300 to at least one electrical apparatus 300.

The agent apparatus 100 learns the received operation control information of at least one electrical apparatus 300 to generate a macro.

When a macro list is pre-stored, the agent apparatus 100 learns the pre-stored macro list and the received operation control information of at least one electrical apparatus 300 to generate a macro, adds the generated macro to the macro list, and stores the updated macro list. In this case, the macro list is updated and stored.

The agent apparatus 100 generates and stores different macro lists for respective users, identifies a user based on user information, searches for a macro list associated with the identified user, and provides the macro list to the user.

The agent apparatus 100 performs learning using environment information, for example, date, time, weather, season, and/or etc., and operation control information of at least one electrical apparatus 300 to generate a macro, adds the generated macro to a macro list, and stores the added macro.

When any one macro is selected through the remote controller 200, the agent apparatus 100 checks operation control information of at least one electrical apparatus 300, contained in the selected macro, and transmits the checked operation control information of at least one electrical apparatus 300 to at least one electrical apparatus 300.

The agent apparatus 100 may directly receive and store macro information transmitted from the remote controller 200. In this case, the agent apparatus 100 also receives and stores user information together with the macro information.

Here, the macro information transmitted from the remote controller 200 is operation control information of at least one electrical apparatus 300, input directly to the remote controller 200 by the user.

The agent apparatus 100 may perform learning based on operation control information of a plurality of electrical apparatuses 300, transmitted from a plurality of remote controllers 200 to generate a macro.

Figure 2:
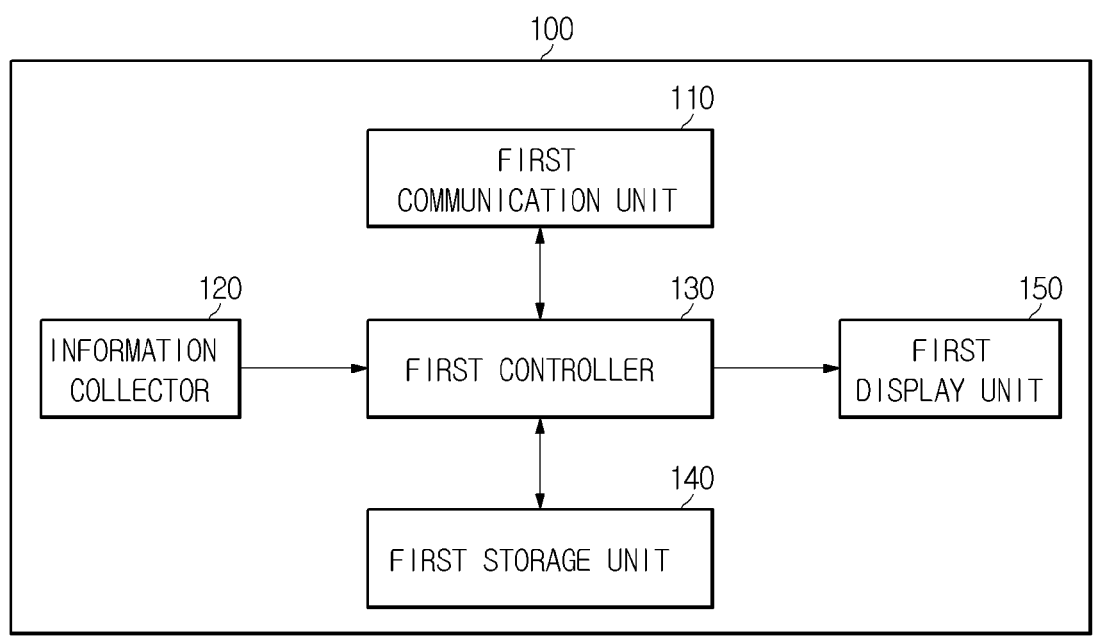
FIG. 2 is a diagram illustrating a detailed structure of an agent apparatus according to an embodiment of the present disclosure.

As illustrated in FIG. 2, the agent apparatus 100 may include a first communication unit 110, an information collector 120, a first controller 130, a first storage unit 140, and a first display unit 150.

The first communication unit 110 communicates with the remote controller 200 and the plurality of electrical apparatuses 300-1, 300-2, and 300-3. The first communication unit 110 communicates with the remote controller 200 in a wireless manner and communicates with a plurality of electrical apparatuses 300 in a wired, wireless, or wired-wireless hybrid manner.

For example, wireless communication may include at least one of infrared (IR) communication, Bluetooth communication, radio frequency (RF) communication, Zigbee communication, and wireless fidelity (W-Fi) communication. However, the present disclosure is not limited thereto. For example, any type of wireless communication that is capable of communicating between the first communication unit and the remote controller 200 may be used.

The first communication unit 110 receives operation control information, of at least one electrical apparatus 300, transmitted from the remote controller 200, and transmits operation control information of at least one electrical apparatus 300 to a corresponding electrical apparatus 300. Here, the operation control information is operation control information input directly by a user or operation control information based on any one macro selected from a macro list.

The first communication unit 110 may receive at least one of user information and environment information, transmitted from the remote controller 200.

The first communication unit 110 may receive operation control information of an electrical apparatus 300, input directly to the electrical apparatus 300 via a button or a touch screen of the electrical apparatus 300, directly from the electrical apparatus 300. From now on, for the convenience, only the button is used to describe the operation of the agent system 10, however, other input method such as a touch screen may be used instead of the button or in combination with the button.

The information collector 120 collects information to generate macros for respective users.

The information collector 120 collects information transmitted from the remote controller 200 or an electrical apparatus 300 or information directly input to an agent apparatus 100.

Here, the information transmitted from the remote controller 200 may include operation control information of an electrical apparatus 300 and user information. The information transmitted from the electrical apparatus 300 may include operation control information of an electrical apparatus 300, user information, and environment information. The information input directly to the agent apparatus 100 may include user information and environment information.

Figure 3:
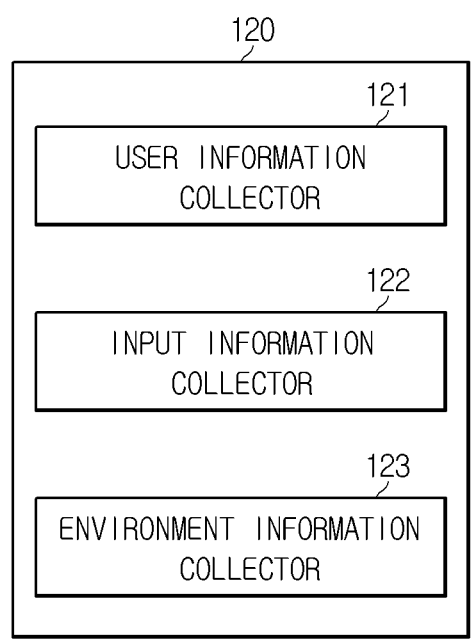
FIG. 3 is a diagram illustrating a detailed structure of an information collector included in an agent apparatus according to an embodiment of the present disclosure.

As illustrated in FIG. 3, the information collector 120 may include a user information collector 121, an input information collector 122, and an environment information collector 123.

The user information collector 121 collects user information to identify a user. The user information collector 121 may include at least one of an image collector to collect images of users, a fingerprint collector to collect images of fingerprints of users, and a voice collector to collect sound.

The user information collector 121 recognizes faces from the collected images, fingerprints from the collected images, or voices from the collected sounds to collect user information.

The user information collector 121 may include an identification (ID) collector to receive user IDs. That is, the ID collector is embodied as, for example, a plurality of buttons or a touch screen and collects signals input through the plurality of buttons or the touch screen.

For example, the plurality of buttons may include a user 1 button, a user 2 button, a user 3 button, a user 4 button, a confirmation button, and/or etc. When a user 1 wants to output a macro list, the ID collector collects signals of the user 1 button and confirmation button, input by the user 1.

The input information collector 122 collects operation control information of an electrical apparatus 300, input through the remote controller 200.

The input information collector 122 collects a macro list which is pre-stored in the first storage unit 140.

The input information collector 122 may identify a user based on at least one of recognized face information, fingerprint information, voice information, and ID information and collect a macro list associated with the identified user.

In addition, when at least one of user information and environment information is input to the input information collector 122 through the remote controller 200, the input information collector 122 may collect at least one of information transmitted from the first communication unit 110.

The environment information collector 123 collects environment information upon receiving operation control information of an electrical apparatus 300. Here, the environment information contains, for example, information regarding date, time, weather, season, and/or etc. However, the environment information is not limited thereto.

The environment information collector 123 may include at least one of a detector to detect at least one of temperature and humidity and a timer to determine date, time, season, and/or etc.

The environment information collector 123 may determine time, date, season, and/or etc. based on count information of the timer.

The environment information collector 123 may receive information regarding date, time, weather, season and/or etc. directly from the user.

For example, the environment information collector 123 may include a weather button of rain, snow, clear skies, fog, etc. In this case, weather may be determined by collecting signals of a button input by the user. As mentioned before, the touch screen may be used instead of the buttons to receive information directly from the user.

Here, environment information regarding weather, season, time, and/or etc. is based upon control of an electrical apparatus 300 such as an air conditioner or an illumination device and is considered when a macro is generated and a macro list is output.

For example, when an electrical apparatus 300 to be controlled is a TV, the environment information collector 123 may collect electronic program guide (EPG) information from the TV.

Referring to FIG. 2, the first controller 130 compares user information collected by the information collector 120 with pre-stored user information to identify a user, generates a macro of the identified user, and adds the generated macro to a macro list associated with the identified user to generate a new macro list.

The first controller 130 generates macros based on environment information. In this case, the first controller 130 extracts operation control information of electrical apparatuses 300 having the same environment information to generate a macro.

The first controller 130 may generate a macro based on the number of times of controlling an operation of an electrical apparatus 300.

For example, when a macro output command is input by the user, the first controller 130 checks current environment information, checks at least one macro having environment information similar to the checked current environment information, and provides the at least one checked macro as a recommended macro to the user.

The first controller 130 controls the first display unit 150 or the first communication unit 110 to output a macro of the identified user.

Figure 4:
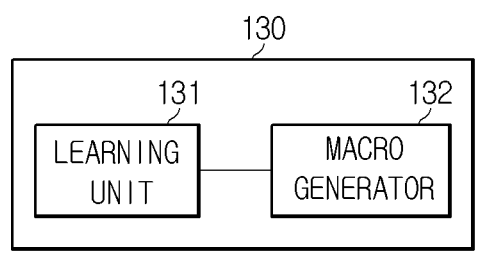
FIG. 4 is a diagram illustrating a detailed structure of a controller included in an agent apparatus according to an embodiment of the present disclosure.

As illustrated in FIG. 4, the first controller 130 may include a learning unit 131 to receive information collected by the information collector 120 upon receiving operation control information of an electrical apparatus 300 or receiving a macro output command from a user, and a macro generator 132 to generate a macro based on a learned result obtained from the learning unit 131.

When operation control information of an electrical apparatus 300 is input to the learning unit 131, the learning unit 131 receives the received operation control information of the electrical apparatus 300, user information of a user who inputs the operation control information of the electrical apparatus 300, and environment information when the operation control information of the electrical apparatus 300 is input to the learning unit 131, compares the received user information with pre-stored user information to identify the user, receives a macro list associated with the identified user, and compares, analyzes, and learns macro information in each macro in the received macro list, the received operation control information of the electrical apparatus 300, and the environment information when the operation control information is input to the learning unit 131.

In this case, the learning unit 131 checks whether environment information when the operation control information is input to the learning unit 131 and information regarding an electrical apparatus 300 for control of an operation thereof are contained in macro information of each macro.

In addition, the learning unit 131 may learn user patterns of respective electrical apparatuses 300 using the number of times of receiving operation control information of an electrical apparatus 300 and the operation control information of the electrical apparatus 300.

When a macro output command is input to the learning unit 131 by a user, the learning unit 131 receives environment information when the macro output command is input to the learning unit 131 and user information of the user who inputs the macro output command, compares the received user information with pre-stored user information to identify the user, receives a macro list associated with the identified user, and compares, analyzes, and learns macro information in each macro in the received macro list and the environment information when the macro output command is input to the learning unit 131.

When any one macro is selected by the user among a plurality of macros of a macro list, the learning unit 131 sums and counts the number of times that the macros are selected and performs learning using the counted number of times that the macros are selected.

The macro generator 132 checks at least one macro having environment information similar to environment information when receiving operation control information of an electrical apparatus 300 among environment information contained in a plurality of macros in a pre-stored macro list and provides at least one checked macro as a recommended macro to the user.

The macro generator 132 checks at least one macro having environment information similar to environment information when the macro output command is input to the macro generator 132 among environment information contained in a plurality of macros in a pre-stored macro list and provides at least one checked macro as a recommended macro to the user.

The macro generator 132 generates a macro based on a learned result of the learning unit 131 and adds the generated macro to a pre-stored macro list to generate a new macro list.

The macro generator 132 may change an order of display of a pre-stored macro list using the number of times that the counted macros are selected.

Figure 9:
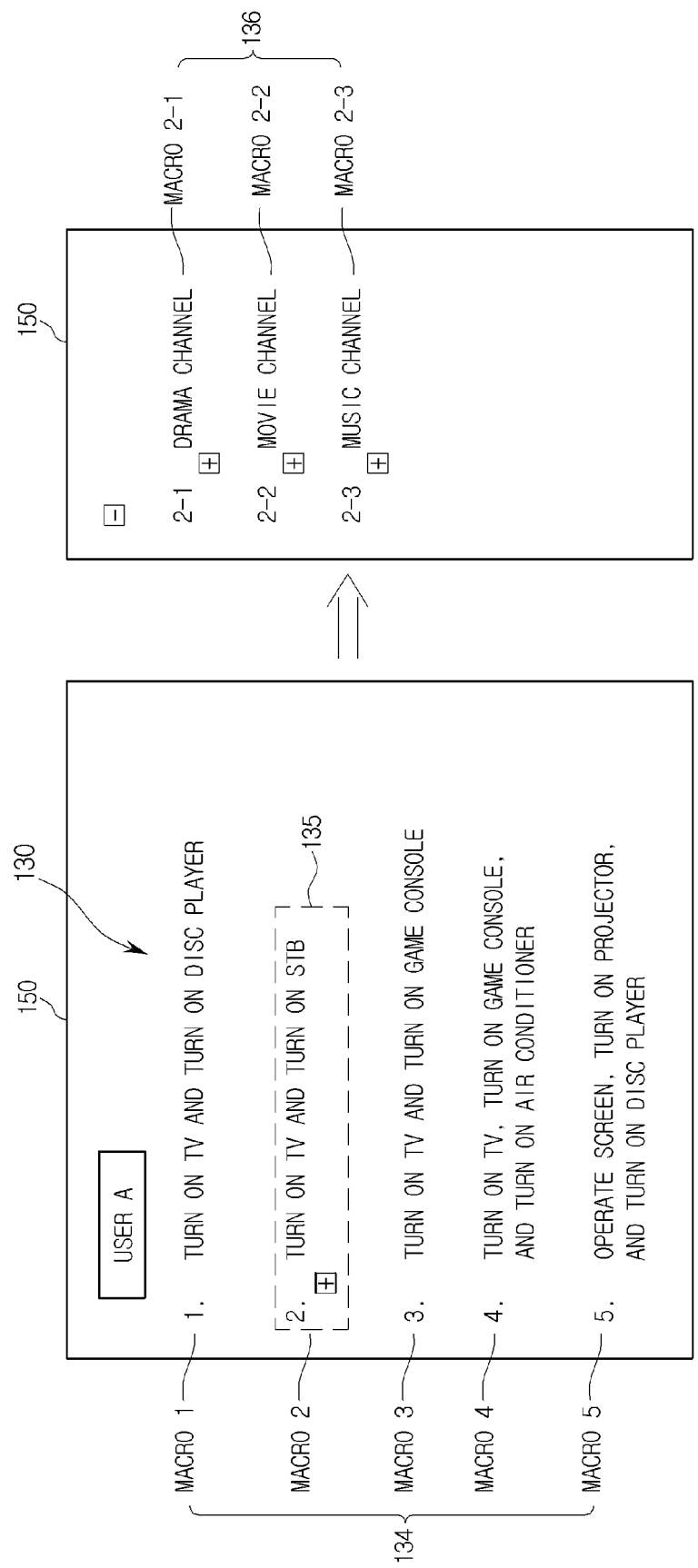
FIG. 9 is a diagram of an example of display of a macro list of an agent apparatus according to an embodiment of the present disclosure.

The macro generator 132 may count the number of times of controlling operations of respective electrical apparatuses 300 and generate a macro list having the generated macros as an upper menu which is a parent menu and displayed in the first display unit 150 (See FIG. 9 for an example), electrical apparatuses 300 sequentially arranged in descending order of the number of times of operation control, and operation control information for respective electrical apparatuses 300 as a lower menu which is a child menu for the upper menu and displayed in the first display unit 150 (See FIG. 9 for an example). The upper menu and the lower menu will be explained later by referring to FIG. 9

Referring to FIG. 2, the first storage unit 140 contains a macro list. When a new macro is generated, the first storage unit 140 inserts the newly generated macro into a pre-stored macro list and stores the updated macro list. That is, when the new macro is generated, the first storage unit 140 updates a previous macro list.

Here, the macro list is stored for each respective user and may include a plurality of macros. Each macro may include user information, operation control information of an electrical apparatus 300, and environment information.

The first storage unit 140 stores user information. For example, the first storage unit 140 stores information of at least one of a face image, a fingerprint image, a voice, and ID of a user, for identification of the user.

In addition, the first storage unit 140 may store titles of a plurality of respective macros in a macro list.

The first display unit 150 displays a macro list according to a command of the first controller 130.

In this case, the macro list may include a plurality of macros as a macro list for each respective user, and each macro may include an upper menu and a lower menu which is a child menu for the upper menu. The upper menu and the lower menu will be explained later by referring to FIG. 9

Referring to FIG. 1, the agent apparatus 100 may include a registration button indicating registration start and registration end of an electrical apparatus 300 and remote controller 200 between which information is to be relayed.

The remote controller 200 is a remote control device to control an operation of at least one electrical apparatus 300 among a plurality of electrical apparatuses 300, is independently provided from an electrical apparatus 300 subjected to operation control, and transmits operation control information of at least one electrical apparatus 300 to the agent apparatus 100.

The remote controller 200 is a universal remote controller to control an operation of a plurality of electrical apparatuses 300, receives operation control information to control an operation of at least one electrical apparatus 300 from a user, and transmits the received operation control information of at least one electrical apparatus 300 to the agent apparatus 100.

In addition, the remote controller 200 may transmit the received operation control information of at least one electrical apparatus 300 directly to the corresponding electrical apparatus 300.

A plurality of remote controllers 200 may be provided to respectively control a plurality of electrical apparatuses 300. In this case, the remote controllers 200 are respectively paired with electrical apparatuses 300 subjected to operation control. Thus, when operation control information is input to the remote controller 200 by a user, the remote controller 200 transmits operation control information to a paired electrical apparatus and also transmits identifying information and operation control information of the paired electrical apparatus to the agent apparatus 100.

The remote controller 200 may include an output command button for output of a macro list and a macro selection button and transmits signals regarding input of the output command button and the macro selection button to the agent apparatus 100.

The remote controller 200 may include an ID button to receive user information. In this case, the remote controller 200 transmits information of the ID button for identification of a user to the agent apparatus 100 together with operation control information of an electrical apparatus 300.

The remote controller 200 may receive macro information directly from the user. In this case, the remote controller 200 transmits the user information and macro information input by the user to the agent apparatus 100.

Figure 5:
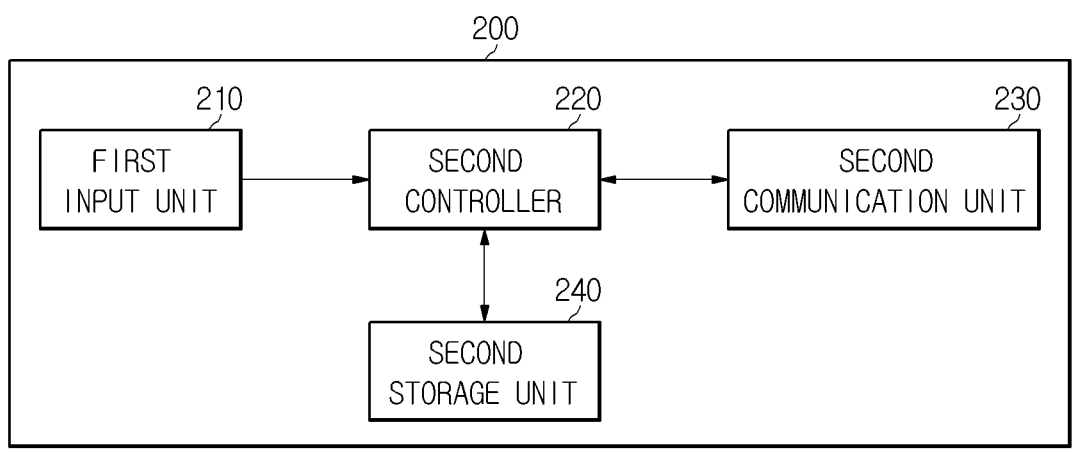
FIG. 5 is a diagram illustrating a detailed structure of a remote controller that communicates with an agent apparatus according to an embodiment of the present disclosure.

As illustrated in FIG. 5, the remote controller 200 may include a first input unit 210, a second controller 220, a second communication unit 230, and a second storage unit 240.

The first input unit 210 receives operation control information of at least one electrical apparatus 300 from a user.

When operation control information of a plurality of electrical apparatuses 300 is input to the first input unit 210, operation control information of the plurality of electrical apparatuses 300 is sequentially input to the first input unit 210 at time intervals.

The first input unit 210 may include a plurality of buttons to receive operation control information of at least one electrical apparatus 300, may include a button to receive user information and a button to receive environment information, and also may include a button to receive a macro output command. However, the present disclosure is not limited thereto. For example, a touch screen may be used with graphical user interface instead of buttons.

The first input unit 210 may further include a user information input unit to receive user information. For example, the user information input unit may include a sound input unit to receive a voice of a user and a fingerprint input unit to acquire a fingerprint of the user.

The first input unit 210 may further include an environment information input unit to receive environment information. In this case, the environment information input unit may include a number button, and an environment button to receive selection of weather, temperature, humidity, season, time, date, and the like.

The first input unit 210 may receive titles of a plurality of macros. In this case, each of the received titles of the plurality of macros is transmitted to the agent apparatus 100.

The first input unit 210 transmits information input by the user to the second controller 220.

The first input unit 210 receives information of an electrical apparatus 300 for new registration and transmits the received information of the electrical apparatus 300 to the second controller 220.

The second controller 220 controls the second communication unit 230 to transmit information received from the first input unit 210 to the agent apparatus 100 and an electrical apparatus 300.

Here, the received information is at least one of operation control information of at least one electrical apparatus 300, user information, and environment information.

The second controller 220 controls pairing with an electrical apparatus 300 for new registration and controls the second communication unit 230 to transmit pairing information with the electrical apparatus 300 for new registration to the agent apparatus 100.

The second communication unit 230 transmits various information input according to a command of the second controller 220 to the agent apparatus 100 or an electrical apparatus 300.

The second storage unit 240 stores device to identify information regarding at least one paired electrical apparatus 300.

Referring to FIG. 1, a plurality of electrical apparatuses 300 may include a first electrical apparatus 300-1, a second electrical apparatus 300-2, and a third electrical apparatus 300-3, and receives operation control information transmitted from the agent apparatus 100 or the remote controller 200 and operates based on the received operation control information.

Each of the electrical apparatuses 300-1, 300-2, and 300-3 may include a plurality of loads (not shown) and performs a predetermined unique function by driving the plurality of loads.

An electrical apparatus 300 having a display function among the plurality of electrical apparatuses 300 may display a macro list transmitted from the agent apparatus 100.

At least one electrical apparatus 300 among the plurality of electrical apparatuses 300 may collect user information for identification of a user, transmit the collected user information to the agent apparatus 100, collect environment information, and transmit the environment information to the agent apparatus 100.

For example, when the electrical apparatus 300 is a TV having a camera, the TV collects images of users, extracts a face image among the collected images, and transmits the extracted face image to the agent apparatus 100. When the electrical apparatus 300 is an air conditioner, the air conditioner collects environment information of detected external temperature and humidity and transmits the environment information to the agent apparatus 100 during an air conditioning operation.

Each of the plurality of electrical apparatuses 300-1, 300-2, and 300-3 may include a third communication unit 310, a second input unit 320, a third controller 330, a third storage unit 340, and a second display unit 350. Only one electrical apparatus 300 among the plurality of electrical apparatuses 300-1, 300-2, and 300-3 will be described with reference to FIG. 6.

Figure 6:
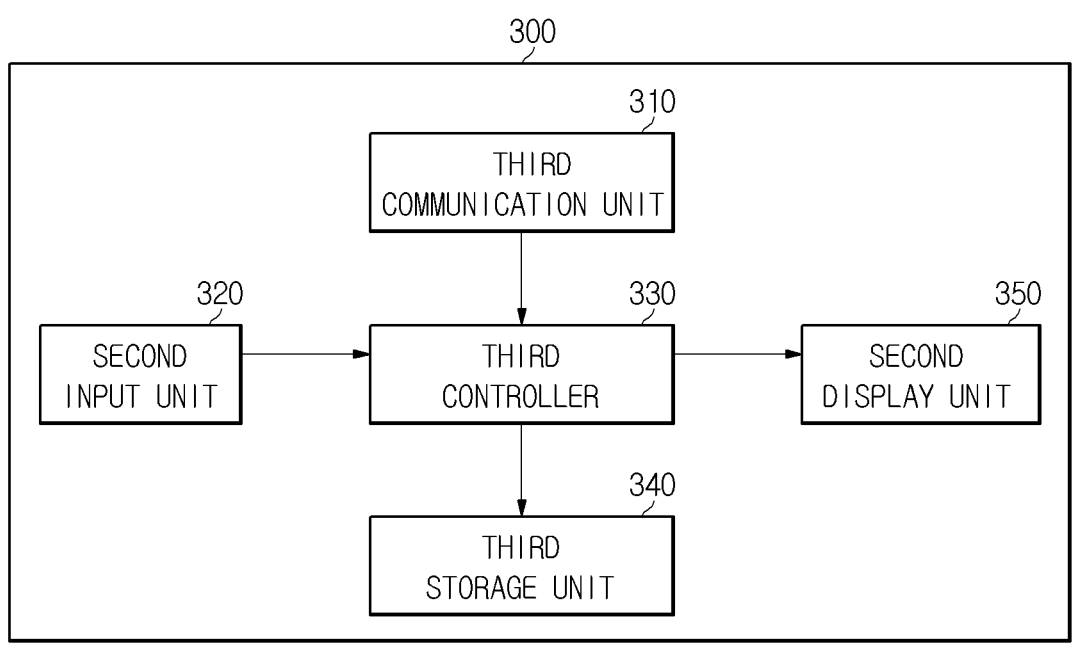
FIG. 6 is a diagram illustrating a detailed structure of an electrical apparatus that communicates with an agent apparatus according to an embodiment of the present disclosure.

As shown in FIG. 6, the third communication unit 310 communicates with the remote controller 200 or the agent apparatus 100 and transmits operation control information transmitted from the remote controller 200 or the agent apparatus 100 to the third controller 330.

The third communication unit 310 may receive a macro list transmitted from the agent apparatus 100 and transmit the macro list to the third controller 330.

In addition, the third communication unit 310 may transmit user information or environment information to the agent apparatus 100 according to a command of the third controller 330.

The second input unit 320 receives operation control information from a user.

The second input unit 320 may include a plurality of buttons to receive operation control information.

The second input unit 320 may receive at least one of user information and environment information.

In this case, the second input unit 320 further may include a user information input unit to input user information and an environment information input unit to receive at least one of environment information.

For example, the user information input unit may include at least one input unit of an image input unit to receive images of users, a sound input unit to receive voices of users, and a fingerprint input unit to acquire fingerprints of users.

In addition, the environment information input unit may include a number button, and an environment button to receive selection of weather, temperature, humidity, season, time, date, and the like.

The third controller 330 controls an operation of at least one load based on the received operation control information. Here, the operation control information is information that is input directly by a user using the remote controller 200 or selected from a macro list.

When the third controller 330 receives a macro list transmitted from the agent apparatus 100, the third controller 330 controls an operation of the second display unit 350 to display the received macro list.

When user information or environment information is input to the third controller 330, the third controller 330 controls an operation of the third communication unit 310 to transmit the input user information or environment information to the agent apparatus 100.

When operation control information is input directly to the third controller 330 through the second input unit 320, the third controller 330 controls an operation of the third communication unit 310 to transmit the input operation control information to the agent apparatus 100.

The third storage unit 340 stores operation control information.

The second display unit 350 displays operation information of an electrical apparatus 300 based on a command of the third controller 330 and display a macro list.

Figure 7:
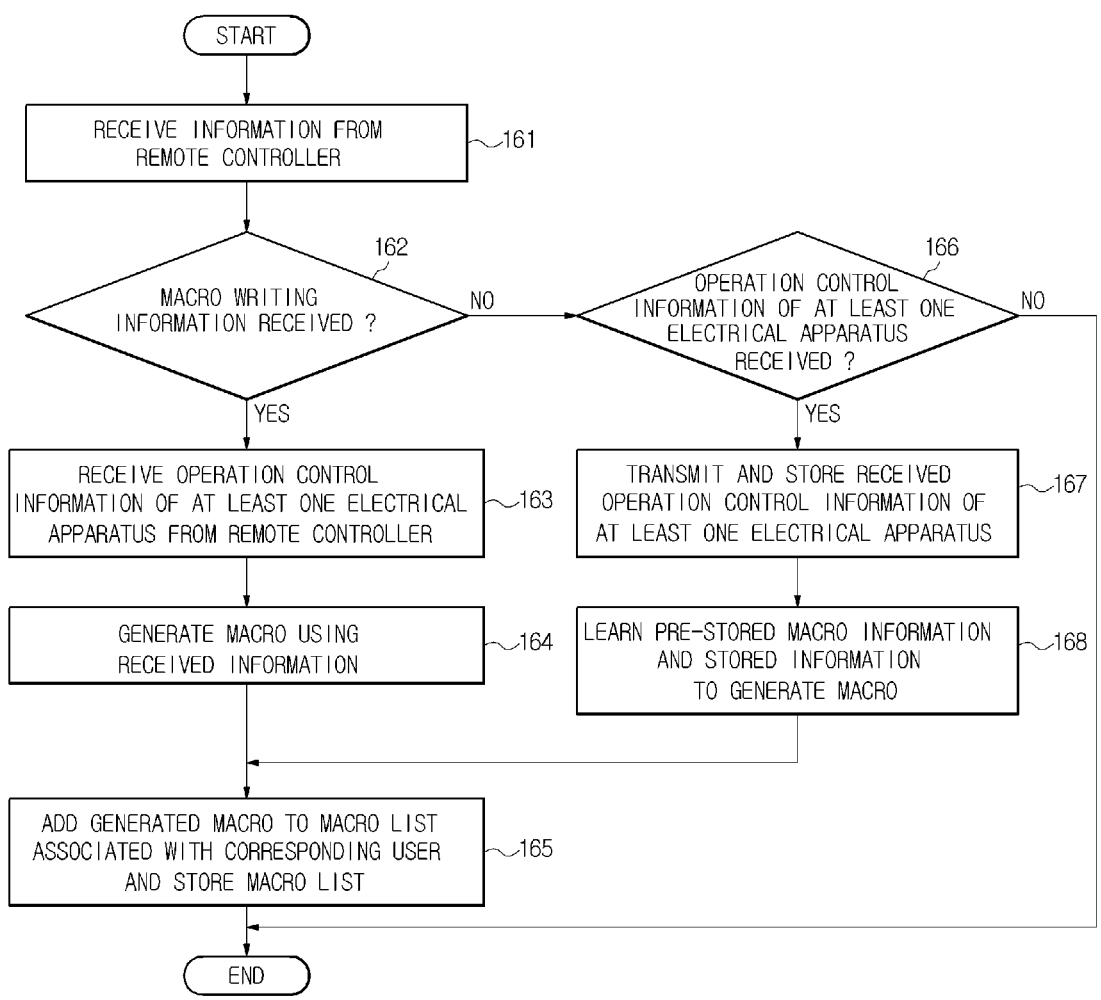
FIGS. 7 and 8 are control flowcharts of an agent apparatus according to an embodiment of the present disclosure.
Figure 8:
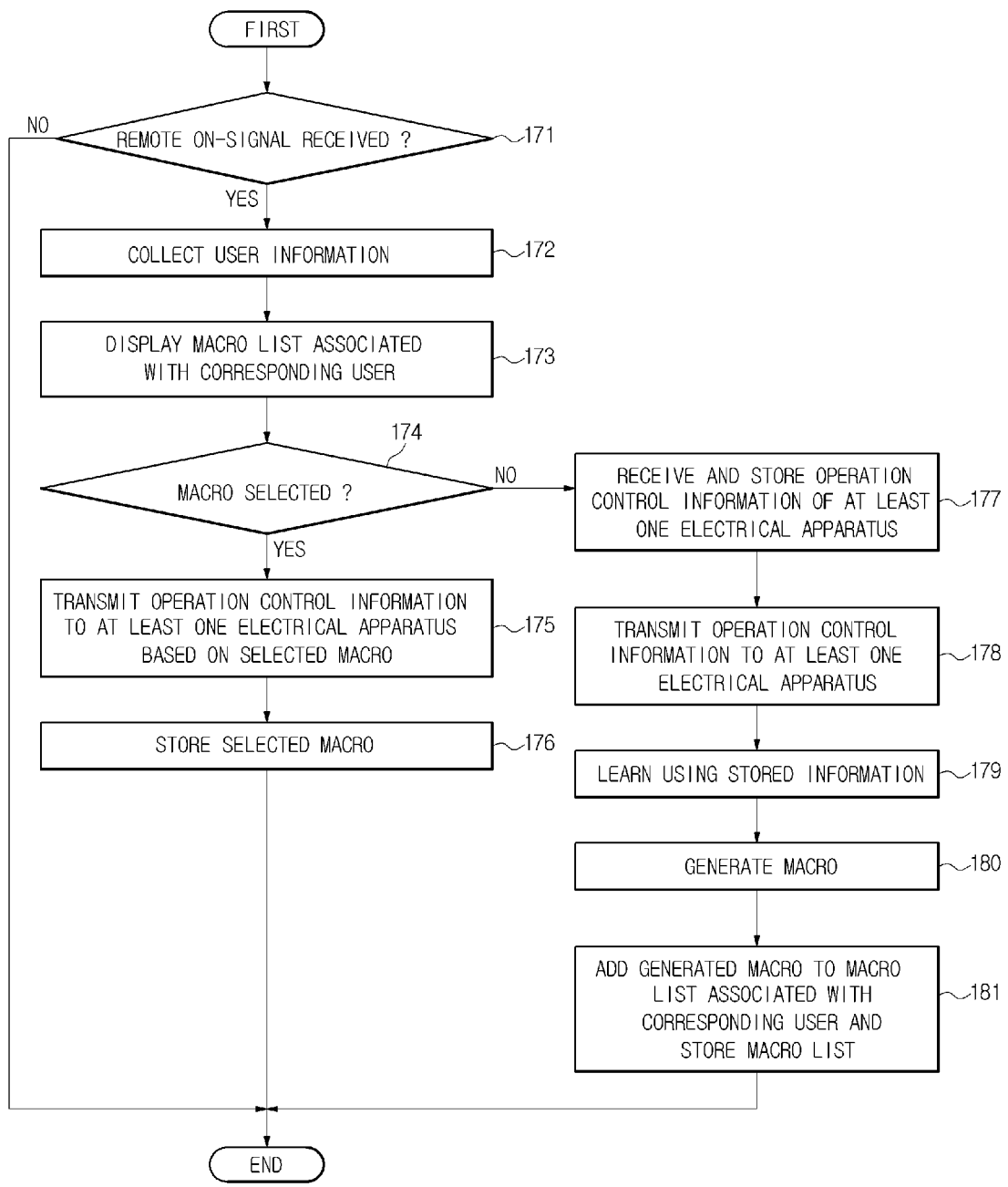

FIGS. 7 and 8 are control flowcharts of an agent apparatus according to an embodiment of the present disclosure.

First, when a signal of a registration button is input to the agent apparatus 100, the agent apparatus 100 registers at least one remote controller 200 and at least one electrical apparatus 300 as a target device to which information is to be relayed.

In more detail, when the signal of the registration button is input to the agent apparatus 100, the agent apparatus 100 receives identification information of at least one electrical apparatus 300 subjected to operation control through the remote controller 200 for control of an operation of at least one electrical apparatus 300 and registers and stores a remote controller 200 and at least one electrical apparatus 300 as a target device to which macro information and operation control information are to be relayed, based on the received identification information of the remote controller 200 and identification information of at least one electrical apparatus 300. Then, when the registration button is re-input to the agent apparatus 100, the agent apparatus 100 stops registering an object to which information is to be relayed.

The agent apparatus 100 may receive identification information of a remote controller 200 and identification information of at least one electrical apparatus 300 from the remote controller 200 or at least one electrical apparatus 300.

In addition, the remote controller 200 and the electrical apparatus 300 may be paired with each other by registering the remote controller 200 and the electrical apparatus 300 in the agent apparatus 100.

The agent apparatus 100 that has completed the registration of the remote controller 200 and at least one electrical apparatus 300 generates a macro based on information transmitted from the remote controller 200, and outputs the macro based on the information transmitted from the remote controller 200. Hereinafter, control of generation of the macro will be described with reference to FIG. 7 and control of macro output will be described with reference to FIG. 8.

First, control of macro generation of the agent apparatus is illustrated in FIG. 7.

The agent apparatus 100 determines whether information of the registered remote controller 200 is input to the agent apparatus 100. Here, whether the information of the remote controller 200 is input to the agent apparatus 100 is determined by determining whether the agent apparatus 100 receives the information input to the remote controller 200.

When the agent apparatus 100 receives the information input to the remote controller 200 (161), the agent apparatus 100 determines whether the received information is macro writing information via direct input (162). As a determination result, when the received information is the macro writing information, the agent apparatus 100 enters a macro writing mode to write macro, receives operation control information of at least one electrical apparatus 300 (163) after entering the macro writing mode, and generates, as a macro, the received operation control information of at least one electrical apparatus 300 (164).

In this case, the agent apparatus 100 identifies a user based on user information transmitted from the remote controller 200, searches for a macro list associated with the identified user, adds the generated macro to the retrieved macro list, and stores the updated macro list (165).

Here, the user information may be collected directly by the information collector 120.

A user is identified by comparing pre-stored user information with received user information and searching for user information matching the received user information from the pre-stored user information.

When information transmitted from the remote controller 200 is not the macro writing information via direct input, the agent apparatus 100 determines whether the transmitted information is operation control information of at least one electrical apparatus 300 (166). As a determination result, when the transmitted information is operation control information of at least one electrical apparatus 300, the agent apparatus 100 transmits the received operation control information to at least one electrical apparatus 300 and stores the received operation control information of at least one electrical apparatus 300 in the first storage unit 140 (167).

When the agent apparatus 100 and an electrical apparatus 300 are capable of two-way communication with each other, the agent apparatus 100 may receive operation control information directly input to the electrical apparatus 300. In this case, the agent apparatus 100 stores the received operation control information of at least one electrical apparatus 300 in the first storage unit 140.

Then, the agent apparatus 100 enters a macro generation mode to generate a macro, collects environment information when the agent apparatus 100 receives operation control information, collects user information of a user who inputs operation control information, and learns collected environment information, user information, and operation control information of at least one electrical apparatus 300 to generate a macro (168).

In addition, when the macro is generated, a title of the generated macro may be set.

The agent apparatus 100 identifies a user based on user information transmitted from the remote controller 200, searches for a macro list associated with the identified user, adds the generated macro to the retrieved macro list, and then, stores the updated macro list (165).

The agent apparatus 100 may further use a plurality of macro information in the retrieved macro list to generate a macro.

In addition, the agent apparatus 100 may compare, analyze, and learn a plurality of macro information in the macro list and environment information when the agent apparatus 100 receives information, and generate a macro based on a learned result.

In this case, the agent apparatus 100 checks whether the environment information when information is input to the agent apparatus 100 is contained in macro information of each macro, and generates macro based on the environment information when the environment information is contained in the macro information.

For example, when the agent apparatus 100 receives operation control information at 7 PM, the agent apparatus 100 performs learning by identifying a user who inputs the operation control information, searching for a macro list associated with the identified user, and comparing and analyzing macro information of a plurality of macros in the retrieved macro list and environment information of 7 PM to check whether macro having environment information of 7 PM is present in macro information of the plurality of macros in the macro list.

As another example, when the agent apparatus 100 receives operation control information at 3 PM, summer, the agent apparatus 100 performs learning by identifying a user who inputs operation control information, searching for a macro list associated with the identified user, and comparing and analyzing macro information of a plurality of macros in the retrieved macro list and environment information of 3 PM, summer to check whether macro having environment information of 3 PM, summer is present in macro information of the plurality of macros in the macro list.

Then, as a learned result, when macros having similar environment information are present, the agent apparatus 100 generates new macro based on the similar environment information.

An example of this case will now be described.

When a macro list including macro 1: air conditioner is turned on at 2 PM, macro 2: air conditioner is turned on at 7 PM, macro 3: TV is turned on 7 AM, and macro 4: TV is turned on at 7 PM is present, the agent apparatus 100 searches for the macro 2 and macro 4 having the same or similar environment information of 7 PM, and combines the macro 2 and the macro 4 to generate a new macro, a macro 5.

Here, the macro 5 has information indicating that an air conditioner is turned on and a TV is turned on at 7 PM.

In addition, the agent apparatus 100 may search for operation control information regarding the same electrical apparatus 300 and generate the retrieved operation control information a lower menu which is a child menu for the upper menu. (See FIG. 9).

An example of this case will now be described.

When a macro list including macro 1: air conditioner is turned on at 2 PM, macro 2: air conditioner is turned on at 7 PM, macro 3: TV is turned on at 7 AM, and macro 4: TV is turned on at 7 PM is present, the agent apparatus 100 generates a macro 5 having information indicating that an air conditioner is turned on at 2 PM and 7 PM, and a macro 6 having information indicating that a TV is turned on at 7 AM and 7 PM.

Here, time when an air conditioner and a TV are turned on corresponds to a lower menu of the air conditioner and TV.

A process of collecting environment information may include receiving information from the remote controller 200 or an electrical apparatus 300 or collecting the information directly by the information collector 120.

In addition, user information may be collected directly by the information collector 120.

Macro output control of the agent apparatus 100 is illustrated in FIG. 8.

The agent apparatus 100 determines whether a power on-signal or a macro output command signal is received from a remote controller 200 (171) and collects user information when the agent apparatus 100 determines that the power on-signal is received from the remote controller 200 (172).

In this case, the user information may be collected through the information collector 120, may be transmitted from the remote controller 200, or may be transmitted from the electrical apparatus 300.

Then, the agent apparatus 100 compares pre-stored user information and the collected user information to identify a user and displays a macro list associated with the identified user through the first display unit 150 (173).

In this case, the macro list associated with the identified user may be transmitted to an external device. Here, the external device is a device to display information.

In addition, the agent apparatus 100 may collect environment information when the power on-signal of the remote controller 200 is received, select at least one recommended macro to be recommended from a pre-stored macro list based on the collected environment information, and then, display the at least one selected recommended macro as a recommended macro list.

For example, when the remote controller 200 is turned on at 7 PM, the agent apparatus 100 identifies a user who manipulates the remote controller 200, searches for a macro list associated with the identified user, compares and analyzes macro information of a plurality of macros in the retrieved macro list and environment information of 7 PM, and displays, as a recommended macro list, at least one macro having environment information of 7 PM among the macro information of the plurality of macros in the macro list.

Then, the agent apparatus 100 determines whether any one macro is selected from among the plurality of macros in the macro list displayed on a first display (174). In this case, when the agent apparatus 100 determines that any one macro is selected, the agent apparatus 100 transmits operation control information to at least one electrical apparatus 300 based on information of the selected macro (175) and stores the selected macro (176).

When the macro selected by the user may include a lower menu, the agent apparatus 100 displays the lower menu of the selected macro, which will be described with reference to FIG. 9.

As illustrated in FIG. 9, assuming that a user A generally views an image at 8 PM, a macro list associated with the user A is displayed on the first display unit 150 at about 8 PM. That is, the first display unit 150 of the agent apparatus 100 outputs and displays, as a recommended macro list, a macro list 133 based on the information of the selected macro (See macro 2 in FIG. 9). As a non-limiting example, a plurality of macros 134 including macro 1, macro 2, macro 3, macro 4 and macro 5, and the macro 2 includes macro 2-1, macro 2-2 and macro 2-3 as shown in FIG. 9. The macro list 133 may include an upper menu 135, which is a parent menu, displays a title, name or content of macro 1, macro 2, macro 3, macro 4 and macro 5, and a lower menu 136 which is a child menu for the upper menu 135, displays a title, name or content of macro 2-1, macro 2-2 and macro 2-3. When the macros in the upper menu 135 includes a child macros, an icon, a symbol, or an indicator may be shown for a user to select, and upon selecting, the lower menu 136 including macros 2-1, 2-2 and 2-3 may be shown or hidden.

When the macro 2 is selected by the user A, the agent apparatus 100 determines that a lower menu 136 of the macro 2 is available in the macro 2. In this case, the agent apparatus 100 may determine that the lower menu of the macro 2 is available in the macro 2 and change information displayed on the first display unit 150 to the lower menu 136 of the macro 2 to display the lower menu 136 of the macro 2 on the first display unit 150.

In addition, the agent apparatus 100 determines whether a lower menu 136 of a macro 2-1 in the lower menu 136 of the macro 2 is available in the macro 2-1. When the lower menu 136 of the macro 2-1 is available in the macro 2-1, the lower menu 136 of the macro 2-1 is displayed on the first display 150.

When the agent apparatus 100 determines the lower menu 136 of the macro 2-1 is not available in the macro 2-1 and only information regarding a channel 7 is available in the macro 2-1, the agent apparatus 100 transmits a power on-signal to a TV and a STB based on operation control information of the macro 2-1 and then transmits a signal of the channel 7 to the TV. In this case, the agent apparatus 100 transmits the signal of the drama channel 7 to the TV such that the drama channel 7 is output by the TV.

In this case, the agent apparatus 100 may receive EPG information from a TV as an electrical apparatus 300, search for a drama channel based on the EPG information, and then, provide the retrieved drama channel as a recommended macro list to a user.

In addition, the agent apparatus 100 may change an order of display of a macro list based on the number of times of selection of a macro.

That is, a large number of times of selection of the macro represents that the user uses the macro many times. Thus, the macro that has been selected many times is displayed at an upper portion of a macro list such that the user easily selects the macro.

When a selection signal is not transmitted to the agent apparatus 100 from the remote controller 200 after the macro list is displayed, that is, when the user does not select a macro, the agent apparatus 100 receives operation control information of at least one electrical apparatus 300, stores the received operation control information of the electrical apparatus 300 in the first storage unit 140 (177), and then, transmits the received operation control information to at least one electrical apparatus 300 (178).

Then, the agent apparatus 100 enters a macro generation mode to generate a macro, collects environment information when the agent apparatus 100 receives operation control information, performs learning using the collected environment information, information of a plurality of macros in a pre-stored macro list, user information, and operation control information of at least one electrical apparatus 300 (179), generates a macro according to a learned result, adds the generated macro to a pre-stored macro list, and stores the updated macro list (181).

Figure 10:
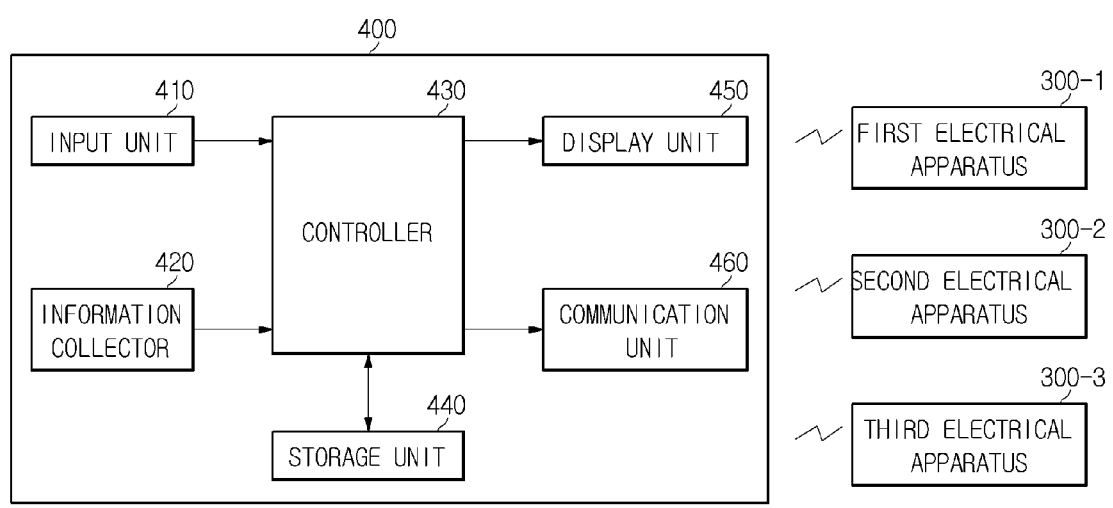
FIG. 10 is a diagram of a structure of an agent system including an agent apparatus according to another embodiment of the present disclosure.

FIG. 10 is a diagram of a structure of an agent system including an agent apparatus 400 according to another embodiment of the present disclosure. An agent system 40 may include the agent apparatus 400, and the plurality of electrical apparatuses 300-1, 300-2, and 300-3.

The agent apparatus 400 is positioned remote from the plurality of electrical apparatuses 300-1, 300-2, and 300-3, communicates with the plurality of electrical apparatuses 300-1, 300-2, and 300-3 in a wired, wireless or a combination of wired-wireless manner, and transmits operation control information that is input to the agent apparatus 400 directly by a user to the plurality of electrical apparatuses 300-1, 300-2, and 300-3.

The agent apparatus 400 learns operation control information of at least one electrical apparatus 300, input by the user, to generate a macro.

When a macro list is pre-stored, the agent apparatus 400 learns the pre-stored macro list and the received operation control information of at least one electrical apparatus 300 to generate the macro, adds the generated macro to the pre-stored macro list, and stores the updated macro list. In this case, the macro list is updated and stored.

The agent apparatus 400 generates and stores different macro lists for respective users, identifies a user based on user information, searches for a macro list associated with the identified user, and provides the macro list to the user.

The agent apparatus 400 performs learning based on environment information regarding date, time, weather, season, and/or etc., and operation control information of at least one electrical apparatus 300 to generate a macro, adds the generated macro to a macro list, and stores the updated macro list.

When any one macro is selected through an input unit 410, the agent apparatus 400 checks operation control information of at least one electrical apparatus 300 of the selected macro and transmits the checked operation control information of at least one electrical apparatus 300 to at least one electrical apparatus 300.

The agent apparatus 400 may include the input unit 410, an information collector 420, a controller 430, a storage unit 440, a display unit 450, and a communication unit 460.

The input unit 410 receives operation control information of at least one electrical apparatus 300 and transmits the received information to the controller 430.

When operation control information of a plurality of electrical apparatuses 300 is input to the input unit 410, operation control information of the plurality of electrical apparatuses 300 is sequentially input to the input unit 410 at time intervals.

The input unit 410 may include a registration button indicating registration start and registration end of an electrical apparatus 300. That is, the input unit 410 receives information of an electrical apparatus 300 for new registration and transmits the received information of the electrical apparatus 300 to the controller 430.

The input unit 410 outputs command button for output of a macro list and a macro selection button.

The input unit 410 may receive titles of a plurality of macros.

The input unit 410 may receive macro information directly from the user.

The information collector 420 collects information to generate a macro for each respective user.

Here, the information to generate the macro is at least one of operation control information transmitted from the input unit 410 or an electrical apparatus 300, user information, and environment information.

The information collector 420 may include a user information collector to collect user information for identification of a user, an input information collector to collect operation control information of at least one electrical apparatus 300, input through the input unit 410, and an environment information collector to collect environment information when the operation control information of the electrical apparatus 300 is input. The user information collector, the input information collector, and the environment information collector are the same as in the aforementioned embodiment, and a detailed description thereof is omitted.

Here, the user information may include at least one of face image information of the user, voice information of the user, fingerprint information of the user, and ID information of the user, and the environment information may include at least one of information of weather, temperature, humidity, season, time, and date.

The controller 430 controls pairing with an electrical apparatus 300 for new registration and stores information regarding the pairing with the electrical apparatus 300 for new registration in the storage unit 440.

The controller 430 compares user information collected by the information collector 420 with user information pre-stored in the storage unit 440 to identify a user, generates a macro of the identified user, and adds the generated macro to a macro list associated with the identified user to generate a new macro list.

The controller 430 generates a macro based on environment information. In this case, the controller 430 extracts operation control information of electrical apparatuses 300 having the same environment information to generate a macro.

The controller 430 may generate a macro based on the number of times of collecting an operation of an electrical apparatus 300.

When a macro output command is input to the controller 430 through the input unit 410, the controller 430 checks current environment information, checks for at least one macro having environment information similar to the checked current environment information, and provides at least one checked macro as a recommended macro to the user.

The controller 430 controls the display unit 450 or the communication unit 460 to output a macro of the identified user.

As illustrated in FIG. 10, the controller 430 may include a learning unit 131, as shown in FIG. 4, to receive information collected by the information collector 420 upon receiving a macro output command from a user or receiving operation control information of an electrical apparatus 300 through the input unit 410, and a macro generator 132, as shown in FIG. 4, to generate a macro based on a learned result obtained from the learning unit 131.

Here, the learning unit 131 and the macro generator 132 are the same as in the aforementioned embodiment, and thus, will be briefly described below.

When operation control information of an electrical apparatus 300 is input to the learning unit 131, the learning unit 131 performs learning by comparing and analyzing the operation control information of an electronic apparatus, user information of a user who input the operation control information of the electrical apparatus 300, environment information when the operation control information of the electrical apparatus 300 is input, and a pre-stored macro list.

The macro generator 132 generates macro lists for respective users. In this case, the macro generator 132 generates a new macro based on a learned result, adds the generated macro to a pre-stored macro list, and stores the updated macro list.

The macro generator 132 may search for macros having similar environment information in a macro list associated with the same user and generate the retrieved macro as a new macro. In addition, the macro generator 132 may search for a macro to control an operation of the same electrical apparatus 300 in the macro list associated with the same user and generate the retrieved macro as a new macro.

The macro generator 132 may generate a macro with an upper menu and a lower menu that are separated from each other. (See FIG. 9 for an example).

The macro generator 132 generates at least one macro as recommended macro based on environment information and provides at least one recommended macro as a recommended macro list to the user.

The storage unit 440 contains macro lists for respective users. When a macro is newly generated, the storage unit 440 inserts the newly generated macro into a pre-stored macro list and stores the macro list. That is, when the new macro is generated, the storage unit 440 updates a previous macro list.

Here, the macro list may include a plurality of macros. Each macro may include user information, operation control information of an electrical apparatus 300, and environment information.

The storage unit 440 stores user information. For example, the storage unit 440 stores information of at least one of a face image, fingerprint image, voice, and ID of a user, for identification of the user.

In addition, the storage unit 440 may store titles of a plurality of respective macros in a macro list.

The display unit 450 may display a macro list according to a command of the controller 430.

In this case, the macro list may include a plurality of macros as a macro list for each respective user. Each macro may include an upper menu and a lower menu. (See FIG. 9 for an example).

The communication unit 460 may transmit operation control information according to a command of the controller 430 and receive at least one of user information transmitted from an electrical apparatus 300 and environment information.

The communication unit 460 may receive operation control information of an electrical apparatus 300, input directly to an electrical apparatus 300 through a button of the electrical apparatus 300, directly from the electrical apparatus 300.

The plurality of electrical apparatuses 300: 300-1, 300-2, and 300-3 receive operation control information transmitted from the agent apparatus 400 and operate based on the received operation control information.

Each electrical apparatus 300 may include a plurality of loads (not shown) and performs a determined unique function by driving the plurality of loads.

An electrical apparatus 300 having a display function among the plurality of electrical apparatuses 300 may display a macro list transmitted from the agent apparatus 400.

When an electrical apparatus 300 and the agent apparatus 400 are capable of two-way communication with each other, the electrical apparatus 300 may transmit environment information and user information that are collected directly by the electrical apparatus 300 to the agent apparatus 400 and also transmit operation control information, which is input to the electrical apparatus 300 through an input unit installed in the electrical apparatus 300, to the agent apparatus 400.

The plurality of electrical apparatuses 300-1, 300-2, and 300-3 are the same as in the aforementioned embodiment, and thus, a detailed description thereof is not omitted.

Figure 11:
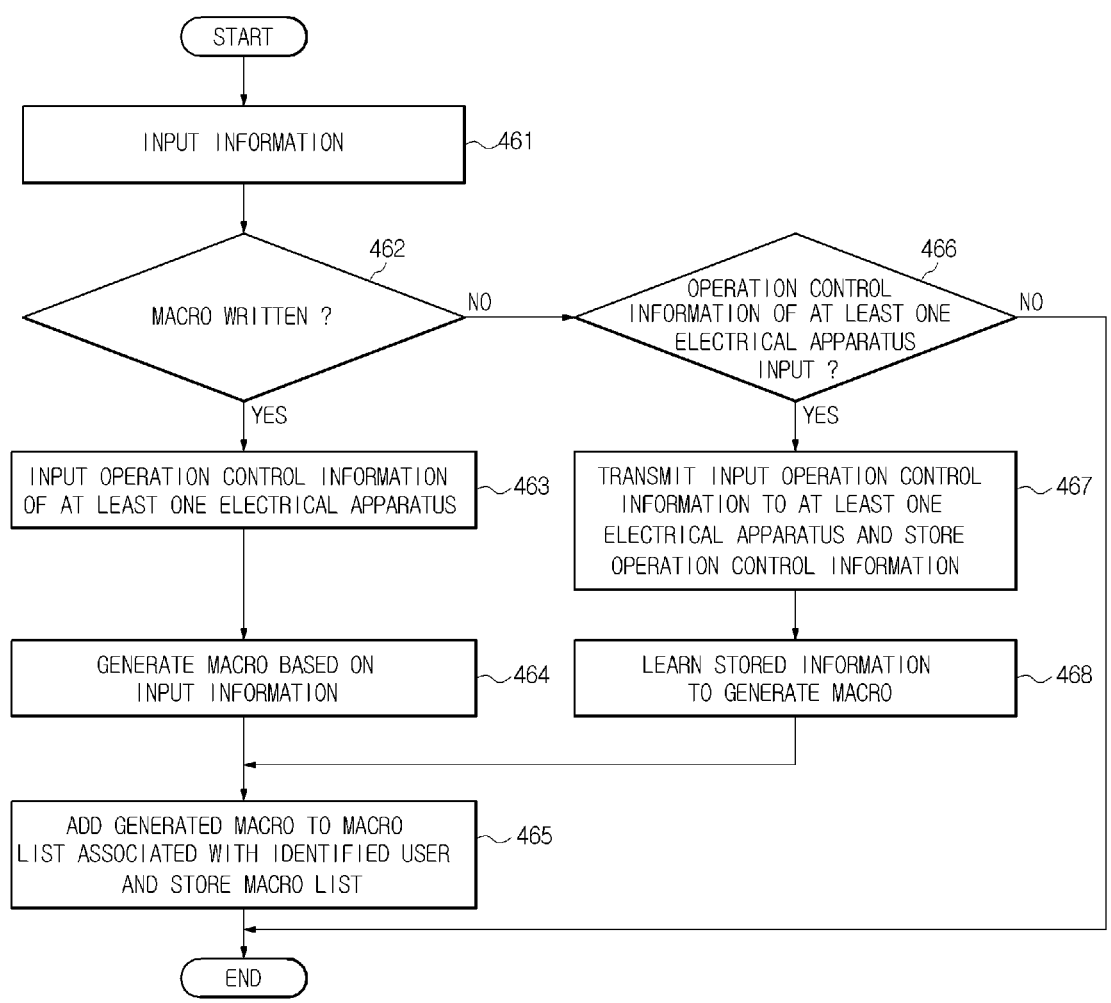
FIGS. 11 and 12 are control flowcharts of an agent apparatus according to another embodiment of the present disclosure.
Figure 12:
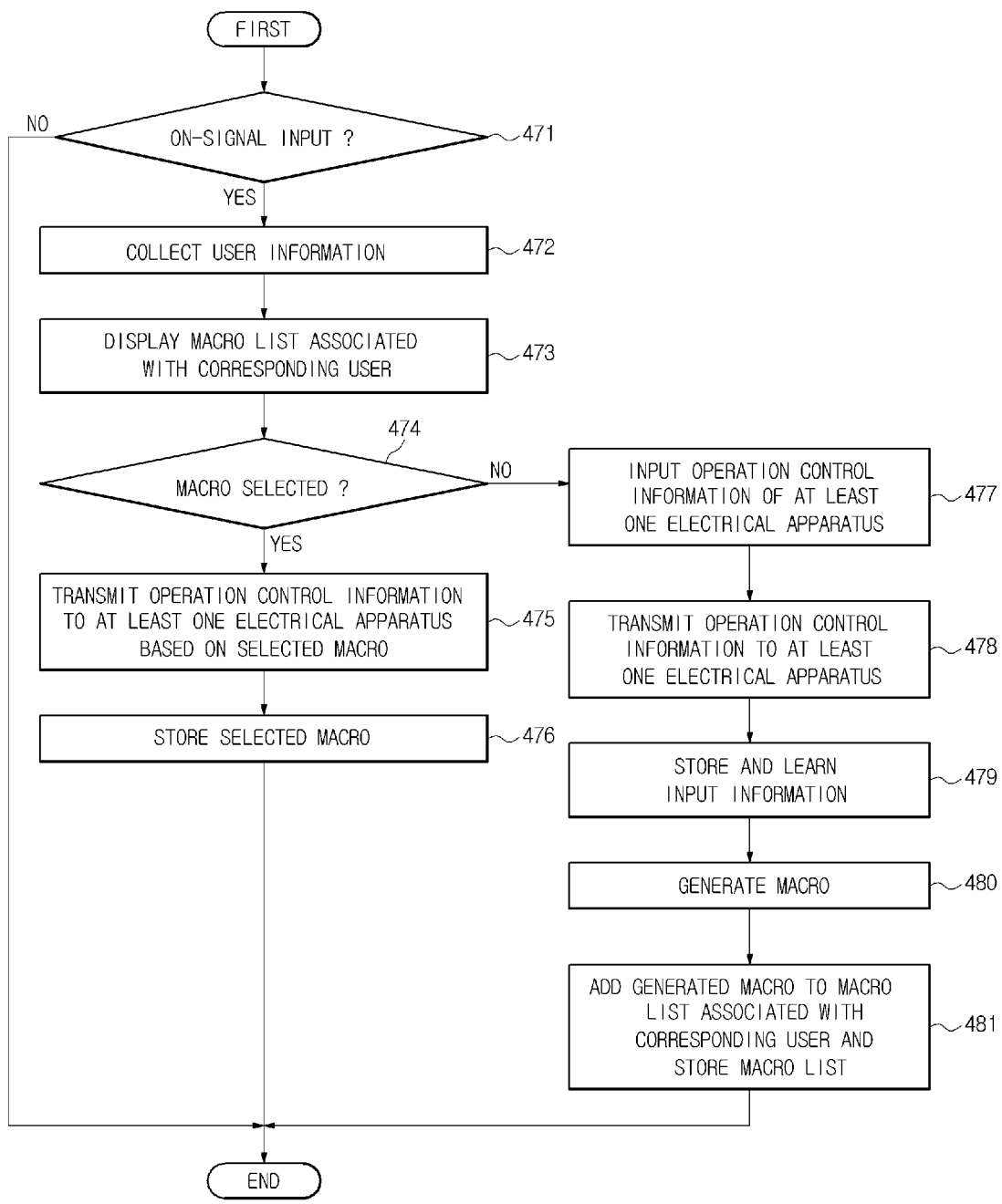

FIGS. 11 and 12 are control flowcharts of an agent apparatus according to another embodiment of the present disclosure.

First, when a signal of a registration button of the input unit 410 is input to the agent apparatus 400, the agent apparatus 400 registers at least one remote controller 200 and at least one electrical apparatus 300 as a target device to be controlled.

In more detail, when the signal of the registration button is input to the agent apparatus 400, the agent apparatus 400 receives identification information of an electrical apparatus 300, and registers and stores an electrical apparatus 300 as a target device to which operation control information is to be provided, based on the received identification information of the electrical apparatus 300. Then, when the signal of the registration button is re-input to the agent apparatus 400, the agent apparatus 400 stops registering a target device to be controlled.

The agent apparatus 400 that has completed the registration of at least one electrical apparatus 300 generates a macro based on input to the input unit 410 and transmits operation control information to at least one electrical apparatus 300.

Here, control of macro generation will be described with reference to FIG. 11 and control of macro output will be described with reference to FIG. 12.

First, control of macro generation of the agent apparatus 400 according to another embodiment of the present disclosure is illustrated in FIG. 11.

The agent apparatus 400 receives information from the input unit 410 (461) and determines whether the received information is macro writing information via direct input (462). As a determination result, when the received information is the macro writing information, the agent apparatus 400 enters a macro writing mode to write a macro, receives operation control information of at least one electrical apparatus 300 (463) after entering the macro writing mode, and generates, as a macro, the received operation control information of at least one electrical apparatus 300 (664).

In this case, when operation control information of a plurality of electrical apparatuses is input to the agent apparatus 400, the agent apparatus 400 may sequentially receive the operation control information of the plurality of electrical apparatuses at time intervals and may input a signal of a completion button to notify that the macro has been completely written.

In this case, the agent apparatus 400 compares user information collected by the information collector 420 and user information stored in the storage unit 440 to identify a user, searches for a macro list associated with the identified user, adds the generated macro to the retrieved macro list, and stores the macro list (465). Here, the user information may be transmitted from an electrical apparatus 300.

When information input to the input unit 410 is not the macro writing information via direct input, the agent apparatus 400 determines whether the transmitted information is operation control information of at least one electrical apparatus 300 (466). As a determination result, when the transmitted information is operation control information of at least one electrical apparatus 300, the agent apparatus 400 transmits the received operation control information to at least one electrical apparatus 300 and stores the received operation control information of at least one electrical apparatus 300 in the storage unit 440 (467).

When the agent apparatus 400 and an electrical apparatus 300 are capable of two-way communication with each other, the agent apparatus 400 may receive operation control information directly input to the electrical apparatus 300. In this case, the agent apparatus 400 stores the received operation control information of at least one electrical apparatus 300 in the storage unit 440.

Then, the agent apparatus 400 enters a macro generation mode to generate a macro, collects environment information when the agent apparatus 400 receives operation control information, collects user information of a user who inputs operation control information, and learns collected environment information, user information, and operation control information of at least one electrical apparatus 300 to generate a macro (468).

In this case, the agent apparatus 400 identifies a user based on user information input to the input unit 410, searches for a macro list associated with the identified user, adds the generated macro to the retrieved macro list, and then, stores the macro list (465).

The agent apparatus 400 may further use a plurality of macro information in the retrieved macro list to generate the macro.

In addition, the agent apparatus 400 may compare, analyze, and learn a plurality of macro information in the macro list stored in the storage unit 440 and environment information when the agent apparatus 400 receives information, and generate a macro based on a learned result.

In this case, the agent apparatus 400 checks whether the environment information when information is input to the agent apparatus 400 is contained in macro information of each macro, and generates a macro based on the environment information when the environment information is contained in the macro information.

A process of collecting environment information may include receiving information from an electrical apparatus 300 or collecting the information directly by the information collector 420.

Macro output control of the agent apparatus 400 is illustrated in FIG. 12.

The agent apparatus 400 determines whether a power on-signal or a macro output command signal is received from the input unit 410 (471) and collects user information when the agent apparatus 400 determines that the power on-signal is received from the input unit 410 (472).

In this case, the user information may be collected through the information collector 420 or may be transmitted from an electrical apparatus 300.

Then, the agent apparatus 400 compares user information that is pre-stored in the storage unit 440 and the collected user information to identify a user and displays a macro list associated with the identified user through the display unit 450 (473).

In this case, the macro list associated with the identified user may be transmitted to an external device. Here, the external device is a device to display information.

In addition, the agent apparatus 400 may collect environment information when a signal is input to the input unit 410, select at least one recommended macro to be recommended from a pre-stored macro list based on the collected environment information, and then, display the at least one selected recommended macro as a recommended macro list.

Then, the agent apparatus 400 determines whether any one macro is selected from among the plurality of macros in the macro list displayed on the display unit 450 (474). In this case, when the agent apparatus 400 determines that any one macro is selected, the agent apparatus 400 transmits operation control information to at least one electrical apparatus 300 based on information of the selected macro (475) and stores the selected macro (476).

When the macro selected by the user may include a lower menu, the agent apparatus 400 displays the lower menu of the selected macro. (See FIG. 9 for an example).

In addition, the agent apparatus 400 may change an order of display of a macro list based on the number of times of selection of a macro.

When a selection signal is not transmitted to the agent apparatus 400 from the input unit 410 after the macro list is displayed, that is, when the user does not select a macro, the agent apparatus 400 receives operation control information of at least one electrical apparatus 300, stores the received operation control information of the electrical apparatus 300 in the storage unit 440 (477), and then, transmits the received operation control information to at least one electrical apparatus 300 (478).

When operation control information is transmitted to a plurality of electrical apparatuses, the operation control information may be sequentially or simultaneously transmitted.

Then, the agent apparatus 400 enters a macro generation mode to generate a macro, collects environment information when the agent apparatus 400 receives operation control information, performs learning using the collected environment information, information of a plurality of macros in a pre-stored macro list, user information, and operation control information of at least one electrical apparatus 300 (479), generates a macro according to a learned result, adds the generated macro to a pre-stored macro list, and stores the updated macro list (481).

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An apparatus to control one or more devices according to a macro, the apparatus comprising:
   an input;
   a storage; and
   a controller configured to:
      generate a macro based on commands sequentially received by the input at time intervals, the macro which is generated by the controller being stored in the storage,
      control, upon receipt of a command selecting the macro received by the input, one or more devices based on a learning process involving operation control information obtained for the one or more devices to be subjected to the macro selected, the control based on the learning process being executed after the macro is generated based on the commands and is stored in the storage,
   wherein the macro generated by the controller is among different macros generated by the controller for respective users, and the controller controls the storage to store the different macros in association with the respective users,
   wherein the macro selected that is involved in the learning process by the controller includes an upper menu related to the one or more devices to be subjected to the macro selected, and upon determining availability of a lower menu, includes the lower menu which is related to the operation control information obtained for the one or more devices.

2. The apparatus according to claim 1, wherein based on the macro generated, the controller generates and stores a respective macro for each of the one or more devices.

3. The apparatus according to claim 1, wherein, when generating the macro, the controller identifies and stores the operation control information of the one or more devices according the macro.

4. The apparatus according to claim 1, wherein the controller generates the macro by entering a macro generation mode, and
   in the macro generation mode, the controller collects environment information based on the commands received by the apparatus, collects user information of a user who inputs the commands, and generates the macro based on the collected environment information, the collected user information, and the commands.

5. The apparatus according to claim 1, further comprising:
   an information collector configured to collect the environment information upon receiving the commands.

6. The apparatus according to claim 5,
   wherein the one or more devices includes a television (TV), and
   wherein the information collector collects electronic program guide (EPG) information from the TV.

7. The apparatus according to claim 1,
   wherein the one or more devices includes a television (TV) having a camera, and
   wherein the TV obtains an image of a face by recognizing the face in the image which is obtained by the camera, and transmits the image obtained by the TV to the apparatus.

8. The apparatus according to claim 1,
   wherein the one or more devices includes an air conditioner, and
   wherein the air conditioner detects temperature and humidity, and transmits the detected temperature and humidity to the apparatus.

9. The apparatus according to claim 1, further comprising;
an information collector configured to collect information for identification of a user among the respective users.

10. A method of controlling an apparatus which controls one or more devices according to a macro, the method comprising:
generating a macro based on commands sequentially received by an input at time intervals;
storing the generated macro, and
controlling, upon receipt of a command selecting the macro, one or more devices based on a learning process involving operation control information obtained for the one or more devices to be subjected to the macro selected, the controlling based on the learning process being executed after the macro is generated based on the commands and is stored by the storing,
wherein the macro generated by the generating is among different macros generated for respective users, and the generated different macros are stored in association with the respective users,
wherein the macro selected that is involved in the learning process by the controlling includes an upper menu related to the one or more devices to be subjected to the macro selected, and upon determining availability of a lower menu, includes the lower menu which is related to the operation control information obtained for the one or more devices.

11. The method according to claim 9, wherein the generating and storing of the macro comprises:
collecting information to identify a user and environment information, from the one or more devices,
generating a macro based on the commands, for the identified user based on the environment information, and
storing the generated macro.

12. The method according to claim 11, wherein the collected information comprises one or more pieces of information of user identification (ID), an image of a face, a voice information, and a fingerprint.

13. The method according to claim 12, further comprising:
entering a macro generation mode to generate the macro,
collecting environment information based on the commands received by the apparatus,
collecting user information of a user who inputs the commands, and
wherein the macro is generated based on the collected environment information, the collected user information, and the commands.

14. The method according to claim 12,
wherein the one or more devices includes a Television (TV), and
wherein the collecting environment information comprises collecting electronic program guide (EPG) information from the TV.

15. The method according to claim 12,
wherein the one or more devices includes a television (TV) having a camera, wherein the television obtains an image of a face by recognizing the face in the image obtained by the camera, and
wherein the collecting of the information to identify the user comprises receiving the obtained image.

16. The method according to claim 12,
wherein the one or more devices includes an air conditioner that is configured to detect temperature and humidity, and
wherein the collecting of the information to identify the environment information comprises receiving the detected temperature and humidity.

17. The method according to claim 9, wherein the generating and storing of the macro comprises:
generating and storing a respective macro for each of the one or more devices.

18. An apparatus to control one or more devices according to a macro, the apparatus comprising:
a storage;
a processor to identify one or more devices according to commands sequentially received;
a controller configured to:
generate a macro based on the commands sequentially received by the processor at time intervals, the macro which is generated by the controller being stored in the storage in association with the one or more devices, respectively, and
control, upon receipt of a command selecting the macro received by the apparatus, the one or more devices to execute at least one operation according to the commands by using the macro without requiring the commands to be sequentially received and based on a learning process involving operation control information obtained for the one or more devices to be subjected to the macro selected, the control based on the learning process being executed after the macro is stored in the storage,
wherein the macro selected that is involved in the learning process by the controller includes an upper menu related to the one or more devices to be subjected to the macro selected, and upon determining availability of a lower menu, includes the lower menu which is related to the operation control information obtained for the one or more devices.

* * * * *